UNITED STATES PATENT OFFICE.

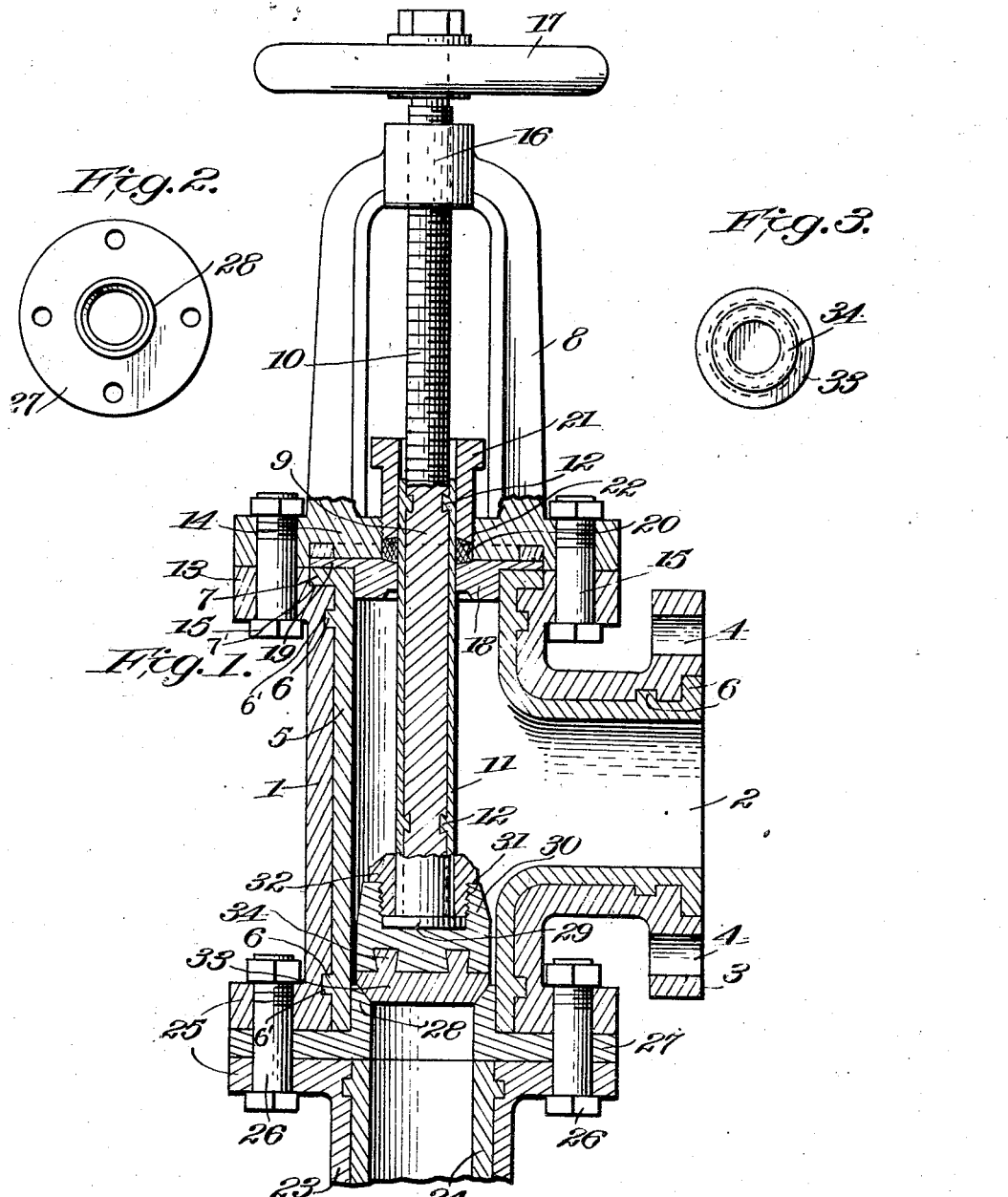

WALTER E. HOWARD, OF RIDLONVILLE, MAINE.

VALVE.

1,258,903.  Specification of Letters Patent.  Patented Mar. 12, 1918.

Application filed November 30, 1912.  Serial No. 734,415.

*To all whom it may concern:*

Be it known that I, WALTER E. HOWARD, a citizen of the United States, residing at Ridlonville, in the county of Oxford and State of Maine, have invented new and useful Improvements in Valves, of which the following is a specification.

My present invention relates to valves.

One object of my invention is to provide a valve having seat means of such construction that the same may be readily removed and renewed when occasion requires.

Another object of my invention is to provide a valve of such construction and employing parts of such material as will render the valve effective for use in connection with relief lines of sulfite digesters.

Further objects of the invention are to generally improve and simplify the construction of a valve device and to provide one that may be manufactured and sold at a moderate figure.

The preferred embodiment of the invention is shown in the drawings accompanying this application, and wherein:—

Figure 1 is a vertical sectional view.

Fig. 2 is a plan view of the disc seat secured intermediate the valve chamber and a connected pipe and Fig. 3 is a plan view of the seat disc carried by the valve rod or stem.

Like reference characters designate like or corresponding parts throughout the several views of the drawings.

Referring specifically to the drawings, 1 designates a valve chamber, which as shown is the chamber of an angle valve. Of course it is immaterial what type of valve is used, the one shown being by way of example merely. The inlet portion of the valve is designated 2 and at said inlet the valve is provided with suitable means to engage supply pipes, the means shown consisting of a flange 3 provided with holes 4 through which connecting bolts may be passed. The chamber preferably has an interior lining 5 of malleable material such as lead which may have fastening collars or flanges 6 and 7 thereon to engage in grooves or recesses 6' and 7' in the chamber. At the upper end the valve chamber is attached in a suitable manner to a bracket member 8 serving as a guide for a valve stem 9 shown as partly provided with screw threads at 10. The lower portion of the valve stem is provided with an exterior lining 11 preferably of lead and positively fastened in place by collars or flanges 12 engaging in annular dovetailed grooves in the rod, and which may be dove-tail in cross section as shown. The means for securing the bracket and valve chamber together is of any suitable type and as shown comprises the flanges 13 and 14 having alining openings through which are passed bolts 15. The bracket 8 at its upper end is provided with an interiorly screw threaded hub 16 on the screw threads of which, the valve stem 9 works. Beyond the hub 16, the stem 9 is provided with a suitable operating device shown as a hand engaging disc 17.

At the upper portion of the chamber 1 is provided a removable disc 18 through which the stem 9 passes, the disc being seated by means of a flange 19 thereof engaging rib or flange of lining 5 and being clamped between the bracket and chamber. It is to be noted that the disc 18 is disposed in the opening at the top of the valve chamber while the flange 19 is disposed above and in alinement with the rib or flange 7 so that when the bolt or nut arrangements 14 and 15 are tightened the bracket pressing against the flange 7 compresses the flange into snug engagement with the recesses 7' in the chamber to consequently increase the efficiency of the joint between the chamber and the bracket.

The plate or base 14 of the bracket is provided with an opening, the wall of which is screw threaded, which opening contains suitable packing 20, which is maintained in tight or packing relation to the valve stem by means of a gland 21 having screw threads at 22 to engage the screw threads of the recess.

The base of the valve chamber 1, is connected in a suitable manner to an outlet pipe which is designated 23 and which has a lining of lead 24 therein. Such means as shown consist of the flanges 25 having suitable openings therein through which are passed bolts 26. Intermediate the pipe 23 and flange 25 of the valve chamber, is secured an annular or disc valve seat designated 27 which is provided with openings through which the bolts 26 may also pass and by means of which it may be secured in position. The disc seat 27 is provided with a flange 28 adapted to extend into the valve chamber. Such flange 21 is beveled or inclined as shown at 22.

The stem 9 is provided with a cap 29 which extends into a recess provided in a head 30. Said head 30 is screw threaded at 31 and receives a nut 32 provided with screw threads to engage the threads 31, to thereby fasten the head to the stem 9. From the head is supported in any suitable manner a disc valve 33 as by means of a ring 34 dove-tail in cross section provided preferably on the disc and engaging in a correspondingly shaped recess in the head 30. The disc 33 is beveled as shown to correspond to the beveled seat of the disc seat member 27.

It is clear that the valve is opened and closed by adjusting the stem 9 through the medium of the disc 17 relatively toward and away from the disc member 27.

By reason of the particular manner of fastening the disc valve seat 27 and the disc valve 33, the same may be readily removed at all times and replaced when necessary or new parts substituted in their stead when they become worn.

The valve described is of a type which is especially useful for connection in relief lines of sulfite digesters. To this end the several parts with which the solution contacts are made of such metal as will not be attacked by the elements of the solution. To this end the valve chamber 1, head 30, nut 32, disc 18 and stem 9 are preferably constructed of bronze and the valve seat disc 27* and valve disc 33 and linings 5 and 11 are preferably made of lead.

In connection with making the disc of the valve 33 of lead, rings such as 34 may be readily driven into effective engagement with the dove-tail slot or recess in the head 30.

As merely the preferred embodiment of the invention has been shown and described, and as changes in the details of construction may suggest themselves, such changes are reserved provided they fall within the spirit and scope of the appended claim.

Having thus described my said invention what I claim as new and desire to secure by Letters Patent is:—

A valve comprising a chambered T-shaped body having ports including inlet and outlet ports, the walls forming two of said ports being provided with recesses at their outer ends concentric to their respective ports and with annular recesses interiorly formed near said ends adjacent the concentric recesses, a protective lining of malleable material having suitable collars or flanges to engage in the several recesses for holding the lining in a fixed position with the body, a disc having a flange secured adjacent the end of one of the ports so that the disc is in contact with the lining, said disc being provided with a hole, a valve stem operable through said hole, said stem being covered with malleable material held in place by engaging in spaced annular dove-tailed grooves, said stem being provided at one end with a head having a beveled valve held thereon by dove-tailed recesses, said head being secured to the stem.

WALTER E. HOWARD.

Witnesses:
HAROLD McINNES,
GEORGE A. HUTCHINS.